(12) United States Patent
Bouaziz et al.

(10) Patent No.: US 10,227,008 B2
(45) Date of Patent: Mar. 12, 2019

(54) OPERATING DEVICE WITH CHARACTER INPUT AND DELETE FUNCTION

(71) Applicant: AUDI AG, Ingolstadt (DE)

(72) Inventors: Tahar Bouaziz, Ingolstadt (DE); Franziska Boehm, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/556,790

(22) PCT Filed: Jun. 4, 2016

(86) PCT No.: PCT/EP2016/000922
§ 371 (c)(1),
(2) Date: Sep. 8, 2017

(87) PCT Pub. No.: WO2017/041867
PCT Pub. Date: Mar. 16, 2017

(65) Prior Publication Data
US 2018/0050592 A1 Feb. 22, 2018

(30) Foreign Application Priority Data
Sep. 11, 2015 (DE) .......... 10 2015 011 649

(51) Int. Cl.
*G06F 3/0488* (2013.01)
*B60K 37/06* (2006.01)
(Continued)

(52) U.S. Cl.
CPC .......... *B60K 37/06* (2013.01); *G06F 3/017* (2013.01); *G06F 3/023* (2013.01); *G06F 3/0233* (2013.01);
(Continued)

(58) Field of Classification Search
CPC .......... B60K 37/06; B60K 2350/1052; B60K 2350/1028; G06F 3/0233; G06F 3/017;
(Continued)

(56) References Cited

U.S. PATENT DOCUMENTS 9,535,511 B2 * 1/2017 Endo ................. G06F 3/0236
2008/0316183 A1 12/2008 Westerman et al.
(Continued)

FOREIGN PATENT DOCUMENTS

| CN | 103534676 A | 1/2014 |
| CN | 104781636 A | 7/2015 |

(Continued)

OTHER PUBLICATIONS

English Translation of the International Preliminary Report on Patentability dated Mar. 15, 2018, in corresponding International Patent Application No. PCT/EP2016/000922, 9 pgs.
(Continued)

*Primary Examiner* — Ibrahim A Khan
(74) *Attorney, Agent, or Firm* — Staas & Halsey LLP

(57) ABSTRACT

An operating device includes an input device that receives a character input of a user, a display device that displays input characters in an input field, and a delete device that deletes at least one character displayed in the input field in a deleting process. The delete device is configured, during the deleting process, in the input field, to move a delete element successively over in each case one of the displayed characters and in so doing in each case to delete the character or to mark it for a deletion to be carried out at the end of the deleting process. The delete device can also be configured to, during the deleting process, to detect a sliding movement of a user's finger on at least one touch-sensitive touch field and to control the movement of the delete element depending on the detected sliding movement.

19 Claims, 2 Drawing Sheets

(51) Int. Cl.
   *G06F 3/023* (2006.01)
   *G06F 3/01* (2006.01)
(52) U.S. Cl.
   CPC ........ *G06F 3/0488* (2013.01); *G06F 3/04883* (2013.01); *G06F 3/04886* (2013.01); *B60K 2350/1028* (2013.01); *B60K 2350/1052* (2013.01)
(58) Field of Classification Search
   CPC .... G06F 3/04883; G06F 3/023; G06F 3/0488; G06F 3/04886
   See application file for complete search history.

(56) References Cited

U.S. PATENT DOCUMENTS

| | | | |
|---|---|---|---|
| 2009/0077464 A1 | 3/2009 | Goldsmith et al. | |
| 2010/0313158 A1* | 12/2010 | Lee | G06F 3/04845 715/769 |
| 2010/0333027 A1* | 12/2010 | Martensson | G06F 3/04883 715/833 |
| 2011/0169743 A1* | 7/2011 | Oh | H04M 1/22 345/169 |
| 2012/0216141 A1* | 8/2012 | Li | G06F 3/04883 715/780 |
| 2012/0287061 A1* | 11/2012 | Yang | G06F 3/0488 345/173 |
| 2013/0067383 A1 | 3/2013 | Kataoka et al. | |
| 2013/0067389 A1* | 3/2013 | Jin | G06F 3/0482 715/783 |
| 2013/0169570 A1* | 7/2013 | Kamii | G06F 3/0488 345/173 |
| 2014/0101579 A1* | 4/2014 | Kim | G06F 3/0486 715/761 |
| 2014/0181722 A1* | 6/2014 | Kim | G06F 3/0233 715/773 |
| 2015/0370477 A1* | 12/2015 | Kim | G06F 3/0486 715/769 |
| 2016/0378200 A1* | 12/2016 | Lee | G06F 3/03547 345/158 |
| 2018/0232062 A1* | 8/2018 | Choi | G06F 3/04886 |

FOREIGN PATENT DOCUMENTS

| | | |
|---|---|---|
| CN | 104823024 A | 8/2015 |
| DE | 10 2013 017 195 A1 | 4/2014 |
| DE | 10 2015 011 649.5 | 9/2015 |
| EP | 2 660 699 A1 | 11/2013 |
| WO | PCT/EP2016/000922 | 6/2016 |

OTHER PUBLICATIONS

German Office Action dated May 19, 2016 from German Application No. 10 2015 011 649.5, 6 pages.
International Search Report dated Aug. 23, 2016 from International Patent Application No. PCT/EP2016/000922, 3 pages.
Chinese Office Action dated Aug. 22, 2018 from Chinese Patent Application No. 201680017255.6, with English language translation of summary of Examiner's comments, (6 pages total).

* cited by examiner

OPERATING DEVICE WITH CHARACTER INPUT AND DELETE FUNCTION

CROSS REFERENCE TO RELATED APPLICATIONS

This application is a U.S. national stage of International Application No. PCT/EP2016/000922, filed on Jun. 4, 2016. The International Application claims the priority benefit of German Application No. 10 2015 011 649.5 filed on Sep. 11, 2015. Both the International Application and German Application are incorporated by reference herein in their entirety.

BACKGROUND

Described herein is an operating device provided, for example, for a motor vehicle. Characters can be input by using the operating device. An input device for receiving a character input of a user is provided for this purpose. A display device displays the input characters in an input field. In order to delete an input character, a delete device is provided, which moves a delete element successively over the displayed characters and in the process deletes or marks for deletion in each case the character over which it has been moved. Also described herein is a motor vehicle including the operating device and a method for operating the operating device.

For the purpose of inputting a character sequence for apparatus operation, in the related art it is known to that end to display an input field by using a display device, into which input field the user can input the individual characters by using an input device. The input can be effected for example by typing in the characters, that is to say by operating a keyboard, or by voice input. In order to delete erroneous characters, a delete key is generally provided. As a result of the key being pressed, a delete element, for example the cursor, is moved step by step over the character input last and the latter is deleted in the process. If the user would like to delete a plurality of characters, the user keeps the delete key depressed, such that the delete element moves successively over a plurality of the displayed characters and deletes them in the process.

In a motor vehicle, in particular, it is difficult here to delete a plurality of characters by keeping the delete key depressed. This is because if the operating device is operated by the driver, for this purpose the driver has to avert his/her gaze from the traffic situation in order to be able to observe the input field. Otherwise it is not clear to the driver when it is necessary for the latter to release the delete key in order to end the deleting process.

SUMMARY

Described herein is an operating device with character input, the operating device being configured to control a process of deleting a plurality of characters that is controllable by the user.

Described herein is an operating device provided, for example, for a motor vehicle. The operating device may include in the manner described an input device for receiving a character input of a user, and a display device for displaying characters input by the character input in an input field. For the purpose of deleting at least one character displayed in the input field, a delete device is provided, which deletes the at least one character in a deleting process. In this case, the delete device is configured, during the deleting process, in the input field, to move a delete element successively over in each case one of the displayed characters and in so doing in each case to delete the character or at least to mark it for a deletion to be carried out at the end of the deleting process.

In order then to provide the user with a control possibility for the delete element, the delete device is configured, during the deleting process, to detect a sliding movement of the user's finger on at least one touch-sensitive touch field. Another designation for touch-sensitive touch field is also a touchpad. The touchpad can also be provided on a screen, thus resulting overall in a touchscreen. The delete device is furthermore configured to control the movement of the delete element depending on the detected sliding movement. The sliding movement arises by virtue of the user continuously touching the at least one touch field with the finger and moving or sliding the finger along the touch-sensitive surface in the process. The sliding movement thus represents a sequence of touch points or touch coordinates which describe a respective touch place or a respective touch location of the finger on the at least one touch-sensitive touch field. Depending on an alteration of the touch place or the touch location as a result of the sliding movement, the position of the delete element in the input field is correspondingly altered as well. Consequently, the number of displayed characters over which the delete element is moved is set depending on a sliding path length of the sliding movement of the finger along the touch field. If the user stops the finger, the delete element is correspondingly also stopped and thus not moved further. The deleting process thus begins with the beginning of the detected sliding movement by virtue of the delete element, proceeding from an initial position which it has at the beginning of the deleting process, being moved over the displayed characters depending on the sliding movement in the input field.

The operating device as described herein affords the advantage that a user, depending on the finger position thereof, which the user alters by using the sliding movement, sets which of the displayed characters are deleted. That is to say that even if the user does not observe the input field, the user can stipulate, solely by setting his/her finger position, how far the delete element is moved in the input field. By interrupting the sliding movement, the user in this case can also concentrate on the traffic, for example, and resume the sliding movement subsequently. As a result, the user can guide the delete element in a targeted manner and/or as planned over the characters to be deleted. By virtue of the fact that the delete element can be guided or moved over a plurality of characters by using the sliding movement, an efficient deletion of a plurality of characters is also made possible. In the operating device described herein, the delete device can be realized by a program module, for example, which is executed by a processor device of the operating device. The processor device can be realized on the basis of a microcontroller or microprocessor, for example. The input device can be configured as a keyboard and/or a voice recognition device, for example. In a manner known per se, the display device can include a screen for displaying raster graphics, by which the characters and the input field are represented as graphical elements. A touch-sensitive touch field can be formed e.g. on the basis of a sensor matrix. The sensors of the sensor matrix can be configured e.g. in each case as a capacitive sensor.

The operating device as described herein also includes optional developments whose features afford additional advantages.

One development relates to stipulating the beginning of the deleting process. In this development, the delete device is designed to determine a sliding path length of the sliding movement proceeding from a touch-insensitive edge of the at least one touch field and, depending on the sliding path length, to set the number of displayed characters over which the delete element is moved. In other words, the user, proceeding from the edge of the at least one touch field, has to slide into the touch field with the finger. This development affords the advantage that the sliding movement for deleting the characters is identified from the fact that it begins at the edge of the at least one touch field. As a result, the at least one touch field can advantageously also be used for identifying other sliding movements for example for controlling a pointer or cursor.

An alternative development provides for the sliding path length to be determined proceeding from a starting point of the sliding movement. This affords the advantage that the user can begin the sliding movement even within the at least one touch field. By way of example, in the touch field it is possible to delimit a partial region as an operating region within which the user has to begin and/or perform the sliding movement in order that the sliding movement is identified or accepted as operation of the delete device.

As already explained, the at least one touch field can be in each case a touchpad, for example, that is to say a touch-sensitive surface, which can be formed by a film, for example. For example, provision may be made for the at least one touch field to be formed or provided in each case by a touchscreen. This development provides for the display device and/or the input device in each case to include a touchscreen and the at least one touch field to be provided by a respective touch-sensitive display area of the respective touchscreen. The fact that the touch-sensitive display area of the display device is encompassed as a touch field affords the advantage that the user can perform the sliding movement above and/or next to the input field and, as a result, the finger position can be correlated directly with the movement and/or position of the delete element of the delete device. The fact that a touch-sensitive display area of the input device is used as a touch field affords the advantage that the user can perform the sliding movement after inputting the characters with the finger directly on the input device itself.

In connection with an input device including a touchscreen, a development is provided in which the input device includes a touchscreen having a touchscreen keyboard, that is to say a graphical representation of a keyboard. Keys of the keyboard can be operated by the touchscreen being touched. In this development, the delete device is configured to identify a swiping movement of the finger extending over a plurality of keys of the touchscreen keyboard as the sliding movement for deletion. As a result, it is advantageously possible to use the display region or representation region of the keys of the touchscreen keyboard for detecting the sliding movement as well. In addition or as an alternative thereto, provision can be made for the touchscreen keyboard to have a specific delete key. By tapping the delete key, it is then possible for the delete element to be moved in each case by one character in the manner known from the related art. By keeping the delete key depressed, it is possible for the delete element to be moved over a plurality of characters in an automated way in the manner known from the related art. Additionally or alternatively, provision is made for the sliding movement to be identified in the display region and/or proceeding from the display region.

One development relates to identifying the end of the deleting process. This development provides for the delete device to be configured to end the deleting process by definite deletion of the at least one displayed character over which the delete element has been moved if the finger is released from the at least one touch field after the detected sliding movement. In other words, the deleting process is ended upon identification of the finger being raised or removed from the at least one touch field. In the case of the marking of the characters to be deleted, this can mean that the deletion of the marked characters is carried out.

One development uses the possibility that, when performing the sliding movement, the user can reverse the sliding direction or direction of movement of the finger along the at least one touch field. This development provides for the delete device to be configured to restore a deleted character or to cancel the marking of a character marked for deletion if the delete element is moved back by the sliding movement in the input field to the initial position. The initial position is that position of the delete element which the delete element has at the beginning of the deleting process, that is to say at the beginning of the detected sliding movement. This development affords the advantage that the user can also move the delete element back again during the deleting process. As a result, deleted characters or characters marked for deletion are protected again from deletion.

One development relates to the positioning of the delete element for a time period outside the deleting process, that is to say when no deleting process is being carried out. In this development, the delete device is configured, after the deleting process, to keep the delete element monostable at an edge of the input field. In other words, the delete element snaps or the delete element moves toward the edge of the input field after the deleting process. This advantageously stipulates the direction of the sliding movement for carrying out the next deleting process. The user, by using the sliding movement, then has to choose that direction by which the delete element is moved toward the displayed characters.

As an alternative to the positioning at the edge of the input field, provision is made for displaying the delete element next to the character respectively input last and for concomitantly moving the delete element with an edge of the series of displayed characters when a further character is input. The delete element thus has the current position of the input cursor. This development affords the advantage that the delete element is arranged directly next to the character to be deleted first, namely the character input last. As a result, with a short sliding path of the sliding movement it is already possible to reach the character input last and to delete it.

One development relates to an embodiment in the operating device in which both the display device and the input device in each case have a dedicated touchscreen. In this development, the delete device is configured, during the deleting process, to optically connect by lines a current touch location or a current touch place of the finger on the touchscreen of the input device to the delete element represented on the display device. This affords the advantage that the display device and the input device can be realized by two touchscreens spaced apart from one another and a representation-technical coupling of the sliding movement to the delete element is nevertheless made possible in this case. An alternative to this development provides for the display device not to include a touchscreen, but rather merely a touch-insensitive screen.

As already explained, also described herein is a motor vehicle. The motor vehicle may include a vehicle apparatus and an embodiment of the operating device as described herein. The operating device is coupled to the vehicle apparatus for the purpose of operating the latter. For operating the vehicle apparatus, the operating device is designed to generate a control signal for controlling the vehicle apparatus depending on the input characters.

Finally, also described herein is a method for operating an operating device. In the method, a character input of a user is received by an input device, the received characters are displayed in an input field by a display device and at least one character displayed in the input field is deleted by a delete device by using a deleting process, wherein during the deleting process, in the input field, the delete device moves a delete element successively over in each case one of the displayed characters and in so doing in each case deletes the character or marks it for a deletion to be carried out at the end of the deleting process. Furthermore, by using the delete device, during the deleting process, a sliding movement of a user's finger is detected on at least one touch-sensitive touch field and the movement of the delete element is controlled depending on the sliding movement.

One development of the method provides for the delete device to restore a deleted character or to cancel the marking of a character marked for deletion if the delete element in the input field is moved back by using the sliding movement to an initial position which the delete element has at the beginning of the deleting process. This affords the advantage already described in connection with the corresponding development of the operating device.

One development of the method provides that the delete device after the deleting process: a) keeps the delete element monostable at an edge of the input field, or b) displays the delete element next to the character respectively input last and concomitantly moves the delete element with an edge of the series of displayed characters when a further character is input.

This affords in each case the advantage already described in connection with the corresponding developments of the operating device.

The method also includes further developments which have features such as have already been described in connection with the developments of the operating device. For this reason, the corresponding developments of the method are not described again here.

The motor vehicle may, for example, be configured as an automobile, for example, as a car.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
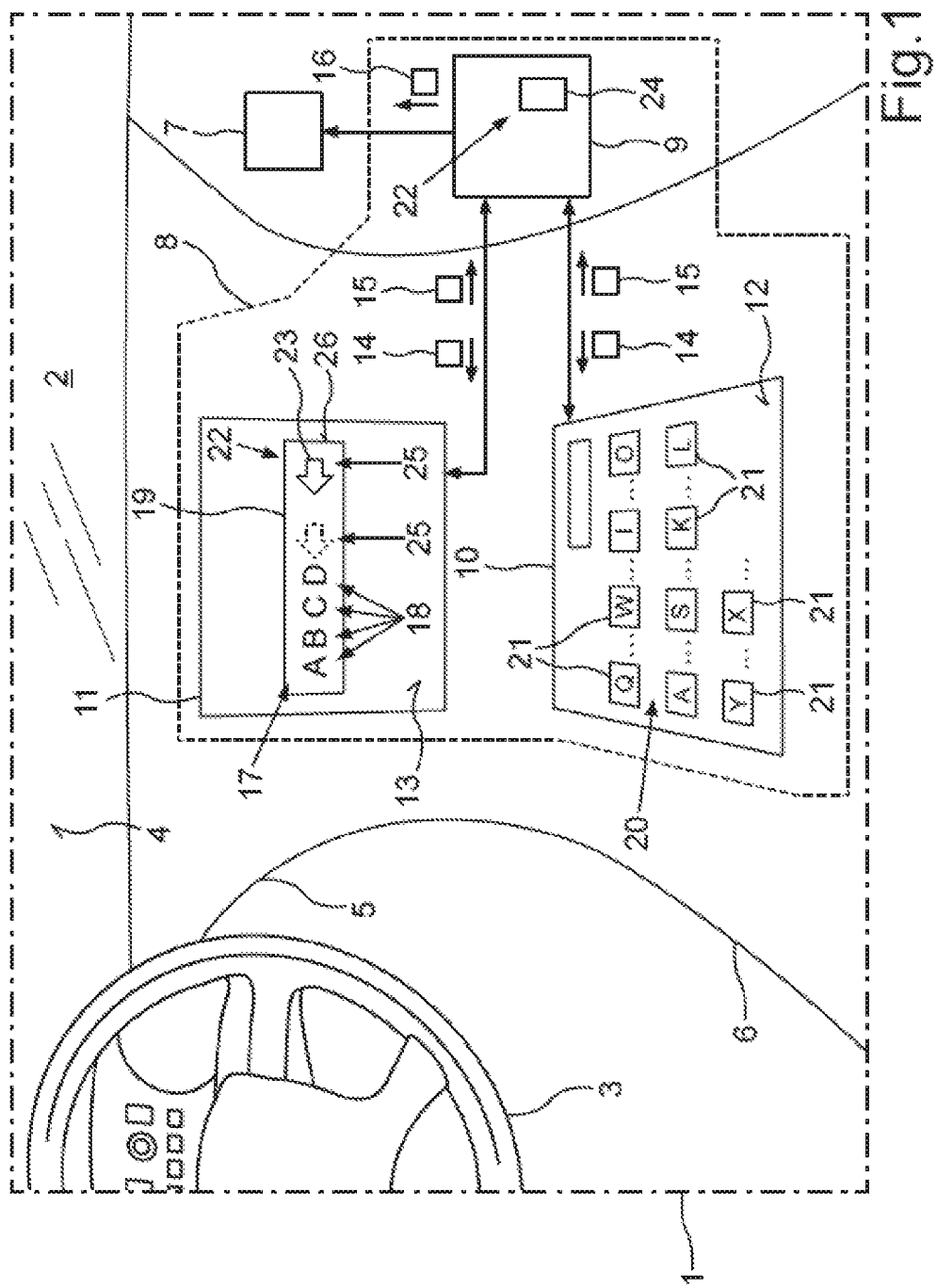
FIG. 1 is a schematic illustration of an embodiment of the motor vehicle described herein.

Reference will now be made in detail to embodiments, examples of which are illustrated in the accompanying drawings, wherein like reference numerals refer to like elements throughout.

Exemplary embodiments are explained with reference to the drawings. In the exemplary embodiments, the described components of the embodiments in each case represent individual features which can be considered independently of one another and which in each case also develop the disclosure independently of one another and thus should also be considered individually and/or in a different combination than that shown. Furthermore, the embodiments described can also be supplemented by further features from among those already described.

In the drawings, functionally identical elements are provided in each case with the same reference signs.

FIG. 1 shows a passenger compartment or vehicle interior 2 from a motor vehicle 1. The motor vehicle 1 can be for example be an automobile, in particular a car. The illustration shows a steering wheel 3, a windshield 4, a dashboard 5, a center console 6, a vehicle apparatus 7 and an operating device 8 for the vehicle apparatus 7. The vehicle apparatus 7 can be for example an infotainment system (information-entertainment system). The vehicle apparatus 7 can also be for example a navigation apparatus or a telephone.

The operating device 8 can include a control device 9 and, for example, two touchscreens 10, 11. Each touchscreen 10, 11 may include a touch-sensitive display area 12, 13. The touch-sensitive display areas (12, 13) each constitute a touch-sensitive touch field. The control device 9 can be realized for example on the basis of a microcontroller or microprocessor.

In order to set or stipulate a display content of the respective display area 12, 13, the control device 9 generates graphical data 14 by which the control device 9 controls the respective touchscreen 10, 11. When the touch-sensitive display area 12, 13 is touched by a user (not illustrated), each touchscreen 10, 11 respectively generates coordinate data or touch data 15, which describe the touch location of the touch on the display area 12, 13 in a manner known per se. The control device 9 generates a control signal 16 for controlling the vehicle apparatus 7 depending on the touch data 15.

The user can input a character series 17 composed of characters 18 by using the operating device 8. Each character 18 of the character series 17 can be for example in each case a letter or a number or a punctuation mark. By way of example, the user can input a place name for stipulating a navigation destination as character series. For this purpose, the touchscreen 10 represents an input device. The touchscreen 11 represents a display device. In other words, the touchscreen 10 represents the input device, and the touchscreen 11 the display device.

Via the touchscreen 11, the control device 9 represents or displays an input field 19, in which the input characters 18 are displayed or represented. On the touchscreen 10, the control device 9 displays or represents a touchscreen keyboard or, for short, keyboard 20. By touching the displayed keys 21 of the keyboard 20, the user can input the characters 18. Only some of the keys 21 are provided with a reference sign in the figures, for the sake of clarity.

If the user when inputting the characters 18 makes a mistake and/or would like to correct the character series 17, the user can do this by using a delete device 22 of the operating device 8. A delete element 23 and a delete controller 24 of the delete device 22 are illustrated in FIG. 1. The delete controller 24 can be realized as a program module of the control device 9. The delete element 23 can be graphically represented as a delete character or delete slide. In the unactuated state of the delete device 22, that is to say when the user does not wish to delete any of the characters 18, the delete element 23 can have an initial position 25 provided for example at an edge 26 of the input field 19. As an alternative thereto, the delete element 23 can be arranged in an initial position 25' which can be situated directly next to the character input last (this is the character D in FIG. 1).

Figure 2:
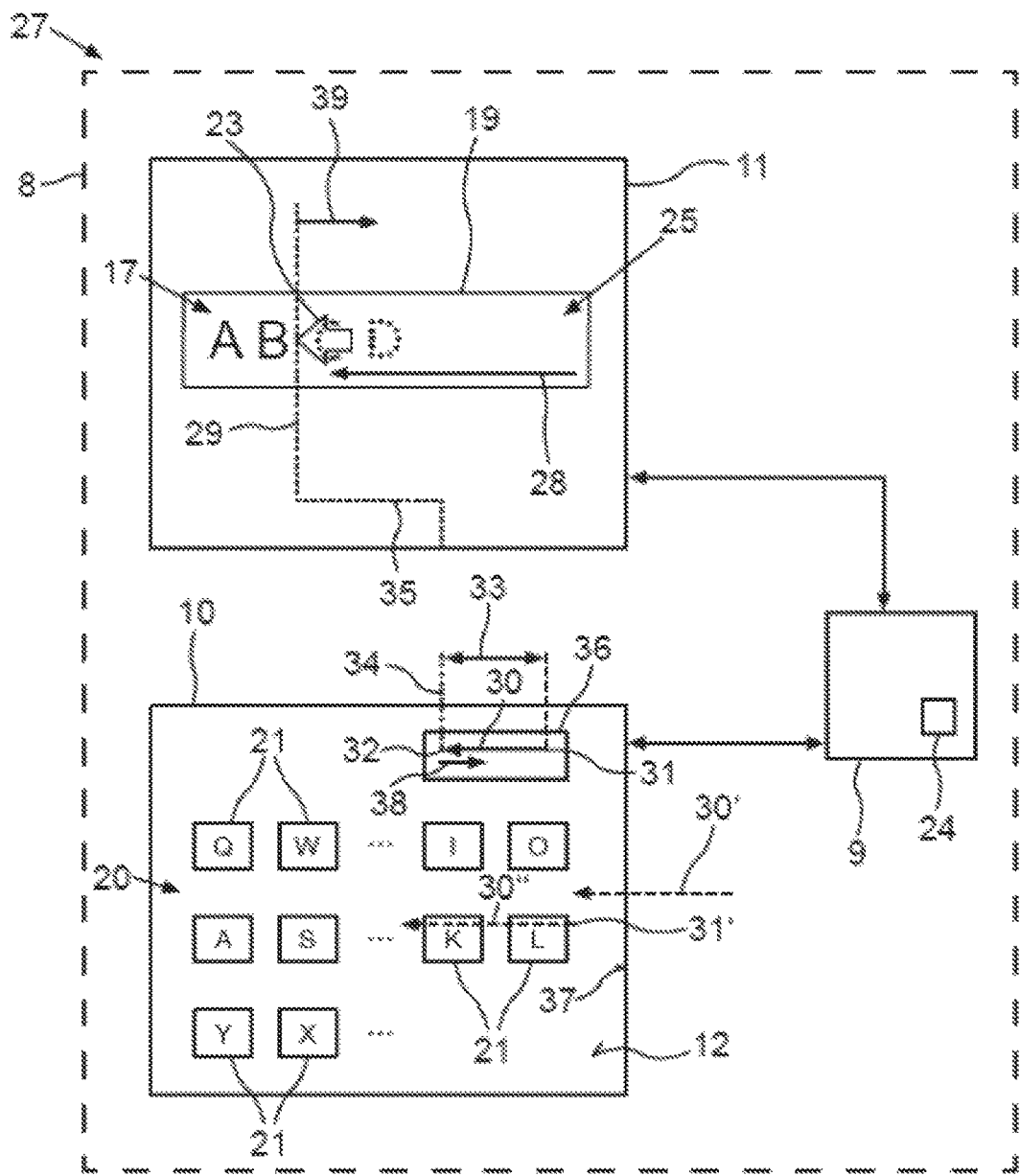
FIG. 2 is the motor vehicle from FIG. 1 during a deleting process that is carried out by a delete device.

The deleting process 27 elucidated below with reference to FIG. 2 is controlled by the delete controller 24.

FIG. 2 elucidates how the delete element 23 proceeding from the initial position 25 has been moved successively over the last two characters C, D input in a deleting movement 28. It can be provided that the characters C, D in the input field 19 are deleted as a result. As an alternative thereto, it can be provided that the characters C, D are marked for deletion. That part of the character string 17 which is to be deleted can be marked by a delete line 29, for example, which indicates what part of the character string 17 will be deleted at the end of the deleting process 27. The deleting movement 28 can be visualized or illustrated for example as animation of the delete element 23. It is also possible to display only the delete line 29 without the delete element 23.

In order to control the deleting movement 23, the user performs a swiping movement or sliding movement 30 with a finger on the display area 12. The sliding movement 30 begins at a starting point 31 and ends at a current touch location 32 of the finger on the display area 12. A sliding path length 33 of the sliding movement 30, i.e. for example the distance between the starting point 31 and the touch location 32, stipulates how far away from the initial position 25 the delete element 23 is moved. This stipulates how many of the characters 18 of the character string 17 are deleted. In other words, the position of the delete line 29 is stipulated. In order to illustrate the relationship, orientation lines or, for short, lines 34, 35 can be provided which indicate a connection between the current position of the delete element 23 and the touch location 32.

In order to detect the sliding movement 30, provision can be made of a delete field 36 in the keyboard 20. The delete field 36 can also have the function of a delete key, for example, in the case of which, by tapping, the delete element 23 is moved on by one character 18 in each case.

In addition or as an alternative thereto, provision can be made for the sliding movement 30 to be detected proceeding from an edge 37 of the touch-sensitive display area 12. This results in an alternative sliding movement 30'. Provision can also be made for a sliding movement 30" for controlling or moving the delete element 23 to be identified if the user carries out the sliding movement 30" over more than one key 21, that is to say for example over two keys or more than two keys, with the finger proceeding from an alternative starting point 31'.

A further advantage of the control of the deleting movement 28 by using the sliding movement 30, 30', 30" is that a reverse movement 38 is also customary during sliding and the delete element 23 carries out a return movement 39 toward the initial position 25 as a result. The characters C, D that have already been deleted in each case or the characters C, D marked for deletion are then restored as a result, such that the deletion is reversed or is not effected.

The deleting process 27 is identified as ended by the delete controller 24 if the user releases his/her finger from the touch-sensitive display area 12. If a marking of the characters C, D to be deleted is provided, then these characters are definitely deleted upon the deleting process 27 being ended.

The delete element 23 thus acts like a delete slide which the user can operate or move with the finger by touch operation. The deletion can be effected for example from the right as far as a target character by virtue of the delete element 23 being dragged from the right into the text line of the input field 25 and being released after sweeping over or being dragged over the region to be deleted, that is to say the characters 18 to be deleted. The delete element 23 is located next to the text or the character series 17. This makes it clear from where deletion was carried out. Alternatively, the delete line 29 can be used to indicate to where deletion is effected. In particular, the deleted text also appears again if, rather than being released, the delete element is simply dragged back again over the characters already deleted. The delete line 29 can be represented as animation corresponding to the finger movement and/or finger position over the entire display area 13 as a vertical line. Preferably, a fingertip display is also effected, that is to say that the sliding movements 30, 30', 30" are graphically visualized on the display area 12.

Overall, simplified and/or intuitive operability results for the user. In particular, operation is simplified for long words. Moreover, distraction of the driver is reduced since the latter's finger can remain at the current touch location 32 on the touchscreen 10 while the driver casts a monitoring glance at the road.

Overall, the example shows how the operating device, motor vehicle, and method described herein, makes it possible to realize deletion in an input field by using a delete slide.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An operating device, comprising:
    an input device, having a first touchscreen, configured to receive a character input by a user;
    a display device, having a second touchscreen different from the first touchscreen or a touch-insensitive screen, configured to display characters, which are input by the user via the input device, in an input field; and
    a processor configured to execute a program to delete at least one character displayed in the input field by using a delete element in a deleting process, the processor further configured to:
        during the deleting process, in the input field, move the delete element successively over in each case one of the characters displayed in the input field and in so doing in each case to delete the character or to mark the character for a deletion to be carried out at an end of the deleting process,
        during the deleting process, detect a sliding movement of a finger of the user on at least one first touch-sensitive touch field provided by a first touch-sensitive display area of the first touchscreen, and to control the movement of the delete element based on the sliding movement of the finger of the user on the at least one first touch-sensitive touch field detected by the processor such that a sliding path distance of the sliding movement corresponds to movement of the delete element, and
        during the deleting process, optically connect by lines a current touch location of the finger on the first touchscreen to the delete element represented in the input field on the display device, when the processor detects the sliding movement of the finger of the user on the at least one first touch-sensitive touch field.

2. The operating device as claimed in claim 1, wherein the processor is configured to determine the sliding path length of the sliding movement proceeding from a touch-insensitive edge of the at least one first touch-sensitive touch field or proceeding from a starting point of the sliding movement and, based on the sliding path length, to set a number of characters displayed on the display device over which the delete element is moved.

3. The operating device as claimed in claim 1, wherein the first touchscreen includes a touchscreen keyboard having a plurality of keys, and
the processor is configured to identify a swiping movement of the finger over the plurality of keys of the touchscreen keyboard as the sliding movement.

4. The operating device as claimed in claim 1, wherein when the sliding movement of the finger of the user is detected on the at least one first touch-sensitive touch field provided by the first touch-sensitive display area of the first touchscreen, the processor is configured to end the deleting process by definite deletion of the at least one character displayed in the input field if the finger is released from the at least one first touch-sensitive touch field after the sliding movement.

5. The operating device as claimed in claim 1, wherein the processor is configured to restore a deleted character or to cancel the marking of a character marked for deletion if, by the sliding movement of the finger of the user, the delete element in the input field is moved back to an initial position which the delete element has at a beginning of the deleting process.

6. The operating device as claimed in claim 1, wherein the processor is configured, after completion of the deleting process, to keep the delete element monostable at an edge of the input field or to display the delete element next to a character input last and to thereafter move the delete element with an edge of a series of characters displayed in the input field when a further character is input.

7. The operating device as claimed in claim 1, wherein the display device has the second touchscreen, and
the processor is configured to, during the deleting process, detect a sliding movement of the finger of the user on at least one second touch-sensitive touch field provided by a second touch-sensitive display area of the second touchscreen, and to control the movement of the delete element based on the sliding movement of the finger of the user on the at least one second touch-sensitive touch field detected by the processor.

8. The operating device as claimed in claim 1, wherein the first touchscreen includes a keyboard having a plurality of keys and a delete field,
the delete element is moved one by one each time the delete field is tapped, and
during the deleting process, the processor is configured to control the movement of the delete element based on the sliding movement of the finger of the user in the delete field detected by the processor such that the sliding path distance of the sliding movement in the delete field corresponds to movement of the delete element.

9. A motor vehicle, comprising:
a vehicle apparatus; and
an operating device, coupled to the vehicle apparatus and configured to operate the vehicle apparatus, the operating device including:
an input device, having a first touchscreen, configured to receive a character input by a user,
a display device, having a second touchscreen different from the first touchscreen or having a touch-insensitive screen, configured to display characters, which are input by the user via the input device, in an input field, and a processor configured to execute a program to delete at least one character displayed in the input field by using a delete element in a deleting process, the processor further configured to:
during the deleting process, in the input field, move the delete element successively over in each case one of the characters displayed in the input field and in so doing in each case to delete the character or to mark the character for a deletion to be carried out at an end of the deleting process,
during the deleting process, detect a sliding movement of a finger of the user on at least one first touch-sensitive touch field provided by a first touch-sensitive display area of the first touchscreen, and to control the movement of the delete element based on the sliding movement of the finger of the user on the at least one first touch-sensitive touch field detected by the processor such that a sliding path distance of the sliding movement corresponds to movement of the delete element, and
during the deleting process, optically connect by lines a current touch location of the finger on the first touchscreen to the delete element represented in the input field on the display device, when the processor detects the sliding movement of the finger of the user on the at least one first touch-sensitive touch field.

10. The motor vehicle as claimed in claim 9, wherein
the first touch-sensitive display area of the first touchscreen includes a partial region within which the user is required to perform the sliding movement,
the processor is configured to determine the sliding path length of the sliding movement proceeding from a starting point of the sliding movement within the partial region, and
the processor is configured to set a number of characters displayed on the display device over which the delete element is moved based on the sliding path length.

11. The motor vehicle as claimed in claim 9, wherein
the first touchscreen includes a touchscreen keyboard having a plurality of keys to receive the character input by the user, and
the processor is configured to identify a swiping movement of the finger over the plurality of keys of the touchscreen keyboard as the sliding movement.

12. The motor vehicle as claimed in claim 11, wherein
the plurality of keys includes a delete key, and
the delete key is configured to, when depressed, cause the delete element to be moved over at least one character to delete the at least one character.

13. The motor vehicle as claimed in claim 9, wherein
the display device has the second touchscreen different from the first touchscreen, and
when the sliding movement of the finger of the user is detected on the at least one second touch-sensitive touch field provided by the second touch-sensitive display area of the second touchscreen, the processor is configured to end the deleting process by definite deletion of the at least one character displayed in the input field if the finger is released from the at least one second touch-sensitive touch field after the sliding movement.

14. The motor vehicle as claimed in claim 9, wherein
the processor is configured to control the delete element to be moved in a first direction based on the sliding movement being in the first direction to delete a character or to mark a character for deletion, and the processor is further configured to restore a deleted character or to cancel the marking of a character marked for deletion by a subsequent sliding movement in a second direction opposite the first direction and by controlling the delete element to be moved back to an initial position before the sliding movement in the first direction.

15. The motor vehicle as claimed in claim 9, wherein the processor is configured, after completion of the deleting process, to keep the delete element monostable at an edge of the input field or to display the delete element next to a character input last and to thereafter move the delete element with an edge of a series of characters displayed in the input field when a further character is input.

16. The motor vehicle as claimed in claim 9, wherein
the vehicle apparatus includes at least one of an infotainment system, a navigation system, and a communication system, or a telephone, and
the operating device further includes a controller configured to generate a control signal to control a function of the vehicle apparatus based on an input to at least one of the input device and the display device.

17. A method for operating an operating device, the method comprising:
receiving, by an input device having a first touchscreen, a character input by a user;
displaying, by a display device having a second touchscreen different from the first touchscreen or a touch-insensitive screen, characters which are input by the user via the input device, in an input field; and
deleting, by a processor executing a program, at least one character displayed in the input field by a deleting process, the deleting including:
during the deleting process, moving, by the processor, a delete element successively over in each case one of the characters displayed in the input field and in so doing in each case deleting the character or marking the character for a deletion to be carried out at an end of the deleting process, during the deleting process, detecting, by the processor, a sliding movement of a finger of the user on at least one first touch-sensitive touch field provided by a first touch-sensitive display area of the first touchscreen, and controlling the movement of the delete element based on the sliding movement of the finger of the user on the at least one first touch-sensitive touch field detected by the processor such that a sliding path distance of the sliding movement corresponds to movement of the delete element, and during the deleting process, the processor optically connecting by lines a current touch location of the finger on the first touchscreen to the delete element represented in the input field on the display device, when the processor detects the sliding movement of the finger of the user on the at least one first touch-sensitive touch field.

18. The method as claimed in claim 17, further comprising:
restoring, by the processor, a deleted character if, by the sliding movement of the finger of the user the delete element in the input field is moved back to an initial position which the delete element has at a beginning of the deleting process.

19. The method as claimed in claim 17, further comprising:
after completion of the deleting process, displaying the delete element next to a character input last and thereafter moving the delete element with an edge of a series of characters displayed in the input field when a further character is input.

* * * * *